United States Patent [19]

Doany et al.

[11] Patent Number: 5,984,478
[45] Date of Patent: Nov. 16, 1999

[54] DYNAMIC OPTICAL COMPENSATION FOR COLOR SEQUENTIAL PROJECTION DISPLAY

[75] Inventors: Fuad Elias Doany, Katonah; James Anthony Misewich, Peekskill, both of N.Y.

[73] Assignee: International Business Machines Corporation, Armonk, N.Y.

[21] Appl. No.: 09/124,587

[22] Filed: Jul. 29, 1998

[51] Int. Cl.[6] .................................................... G03B 21/14
[52] U.S. Cl. ................................. 353/84; 353/31; 348/743
[58] Field of Search .............................. 353/31, 33, 34, 353/37, 20, 84, 69; 349/5, 7, 9; 348/742, 743

[56] References Cited

U.S. PATENT DOCUMENTS

| | | | |
|---|---|---|---|
| 5,371,543 | 12/1994 | Anderson | 348/743 |
| 5,463,433 | 10/1995 | Koo | 353/84 |
| 5,467,146 | 11/1995 | Huang et al. | 348/743 |
| 5,612,753 | 3/1997 | Poradish et al. | 348/743 |
| 5,784,038 | 6/1998 | Irwin | 348/743 |
| 5,805,243 | 9/1998 | Hatano et al. | 353/84 |
| 5,863,125 | 1/1999 | Doany | 353/84 |
| 5,868,482 | 2/1999 | Edlinger et al. | 353/84 |

*Primary Examiner*—William C. Dowling
*Attorney, Agent, or Firm*—Scully, Scott, Murphy, Presser; Daniel P. Morris

[57] ABSTRACT

A display for displaying a color image formed of a plurality of color light components is provided, wherein each color light component has a focal length and a magnification. The display has a light source for providing polarized light of a first polarization and a color filter wheel having segments of different color filters for sequentially separating the polarized light into a plurality of different color lights. Also provided is a directing means for directing the different color lights having the first polarization to a light valve and for directing respective color light components of a second polarization transmitted from the light valve towards a screen. A dynamic focus element is provided in the display for adjusting the focal length and/or magnification of each color light component to minimize chromatic variations between the color light components. Lastly, a lens is provided for magnifying and projecting the adjusted color light components onto the screen to produce the color image. In variations of the present invention, the dynamic focus element are various mechanical and electro-optical devices.

25 Claims, 9 Drawing Sheets

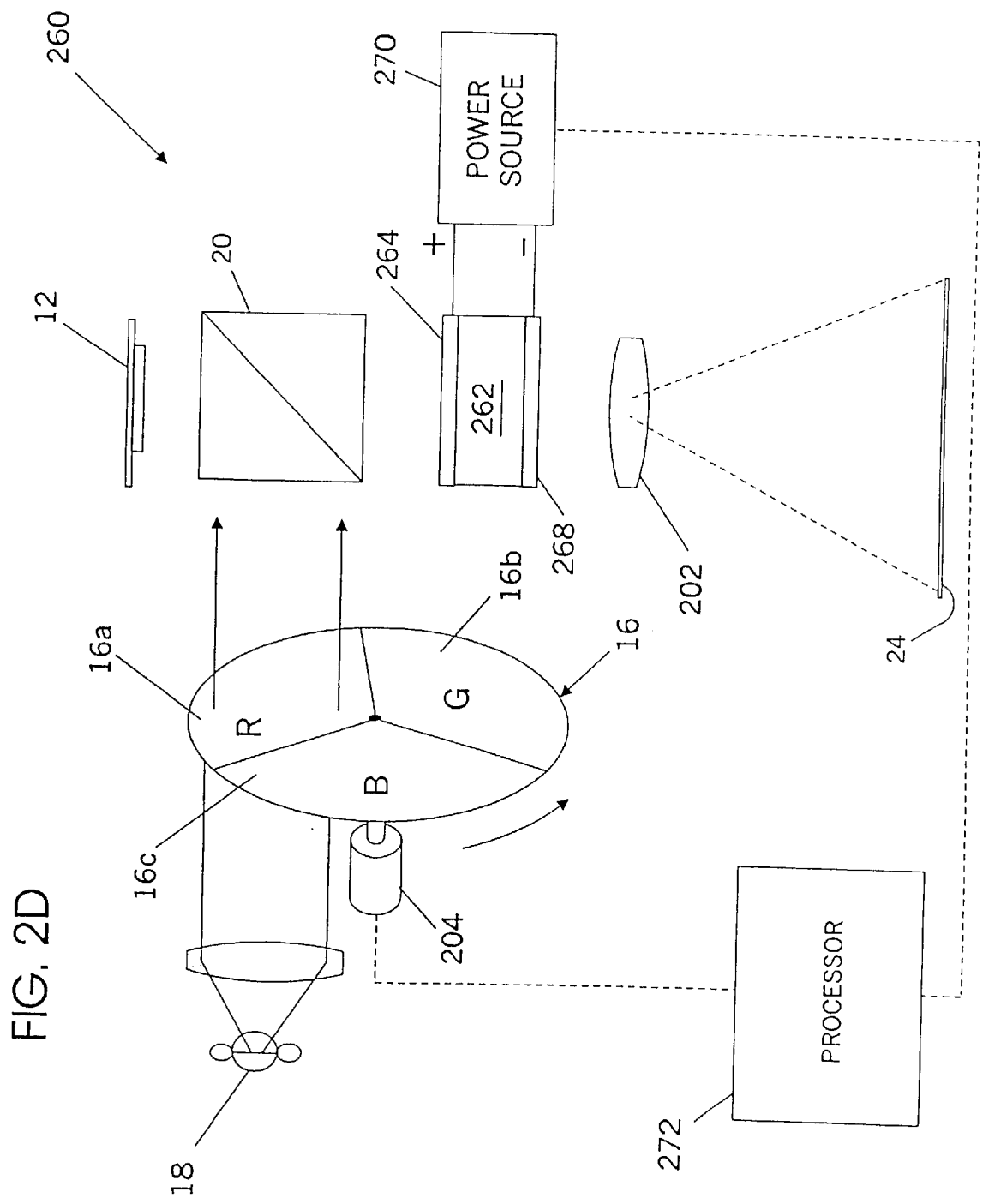

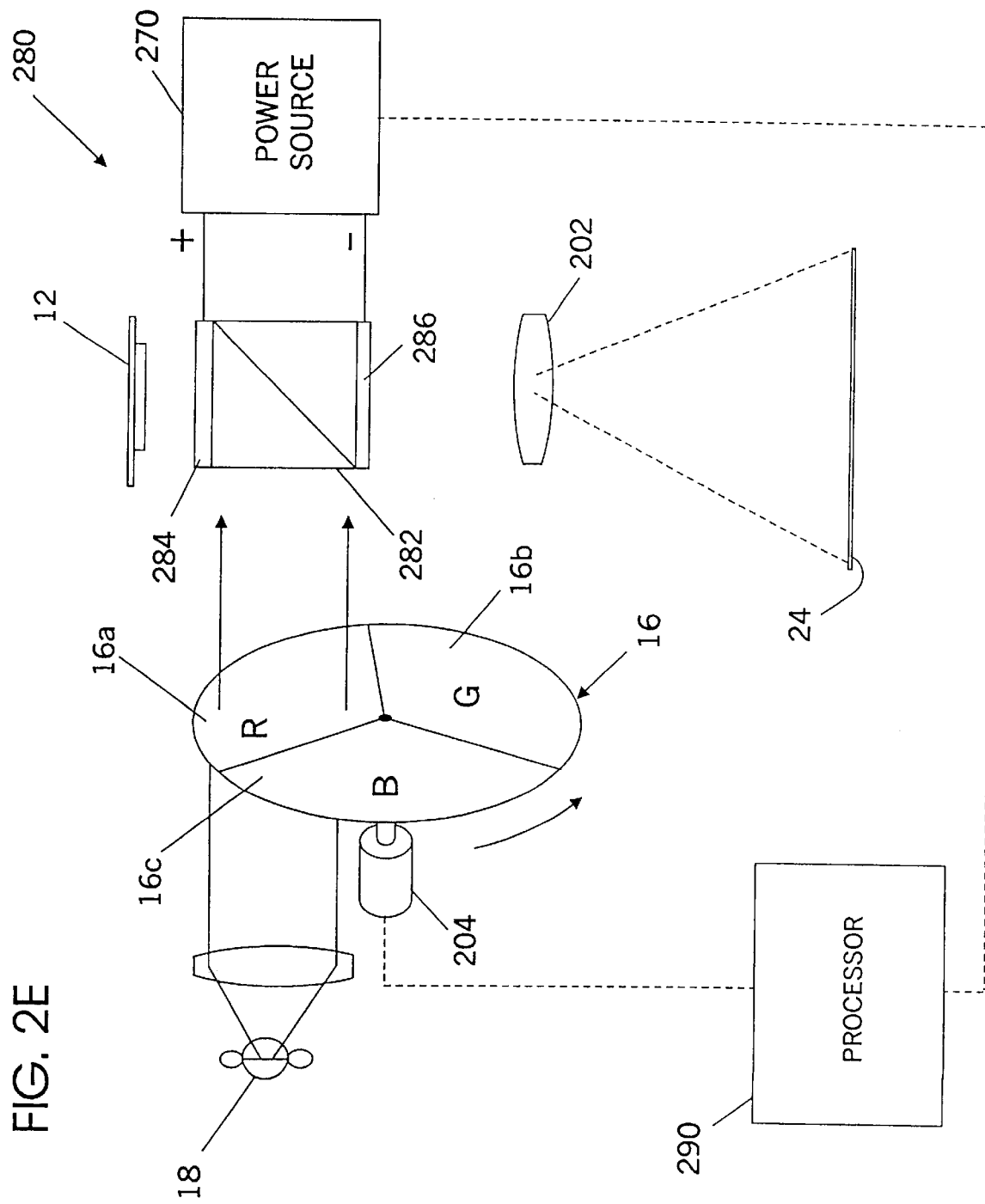

DYNAMIC OPTICAL COMPENSATION FOR COLOR SEQUENTIAL PROJECTION DISPLAY

BACKGROUND OF THE INVENTION

1. Field of the Invention

The field of art to which this invention relates is display devices. It is more particularly directed to color sequential liquid crystal displays.

2. Description of the Related Art

Color projection displays based on liquid crystal technology require a scheme to control the three primary colors necessary to produce an image. One implementation calls for the use of three liquid crystal spatial light modulators (SLMs), one for each color. However, the optics required for splitting and recombining the three colors leads to a complicated and costly system that is difficult to fit in a compact display.

The number of SLMs, or light valves, can be reduced if color sequencing is used. In the color sequential mode of operation, the red, green and blue components are imaged sequentially in time at three times the typical rate (e.g., 3×60 Hz=180 Hz).

As long as the three color images are presented at a fast enough rate to the viewer, the time-averaged image of the three individual colors appears as the composite full-color image.

A simplified, typical configuration for a single light valve display is shown in FIGS. 1A and 1B. It consists of a white light lamp source 18 combined with a color filter wheel 16 which sequentially alternates the red, green and blue primary colors 16a, 16b, 16c respectively. In the reflective SLM mode illustrated in FIG. 1A, a polarizing beamsplitter cube 20 directs one polarization of each color component onto the SLM 12. The SLM 12 will rotate the polarization of the selected pixels to create that color component of the image. The image formed by the modulated polarization will be reflected by the SLM 12 and will pass through the beamsplitter cube 20. A lens 22 is then used to magnify this image and project it onto a screen 24. The process is then repeated for the other two color components.

For the transmission SLM mode illustrated in FIG. 1B, each color component is directed onto a transmission liquid crystal panel 14 which is placed between two polarizing films 26, 28 that are oriented 90° to one another. Light will be transmitted through the cross polarizers 26, 28 only for pixels that have modulated the incoming polarization by the transmissive liquid crystal panel 14. The transmitted modulated light will then be imaged by a projection lens 22 onto the screen 24.

In order to maintain high optical quality in the image, a sophisticated lens 22 must be manufactured which works well for all three colors. In particular, the magnification of the lens 22 must be identical for the three colors to ensure pixel overlay over the entire image. A totally achromatic projection lens 22 is difficult to design and expensive to fabricate.

The polychromatic nature of the light source presents an additional problem in the operation of the liquid crystal cell itself. Typically, the type of liquid crystal material and the thickness of the liquid crystal layer in the cell can be optimized to produce a 90° polarization change for only one color. For the other two colors, the polarization rotation will not be complete. Incomplete polarization rotation will result in lower throughput, chromatic gray scale variations and loss of contrast.

SUMMARY OF THE INVENTION

It is an object of the present invention to provide a liquid crystal display having a simple and inexpensive projection lens.

It is another object of the present invention to provide a liquid crystal display in which the polarization rotation occurring in the liquid crystal material is optimized for each color of the display.

Accordingly, in a first embodiment of the present invention, a display for displaying a color image formed of a plurality of color light components is provided, wherein each color light component has a focal length and a magnification. The display comprises a light source for providing polarized light of a first polarization and a color filter wheel having segments of different color filters for sequentially separating the polarized light into a plurality of different color lights. Also provided is a directing means for directing the different color lights having the first polarization to a light valve and for directing respective color light components of a second polarization transmitted from the light valve towards a screen. A dynamic focus element is provided in the display for adjusting the focal length and/or magnification of each color light component to minimize chromatic variations between the color light components. Lastly, a lens is provided for magnifying and projecting the adjusted color light components onto the screen to produce the color image.

In a second embodiment of the present invention, the display comprises a light source for providing polarized light of a first polarization and a color filter wheel having segments of different color filters for sequentially separating the polarized light into a plurality of different color lights. Also provided is a directing means for directing the different color lights having the first polarization to a light valve and for directing respective color light components of a second polarization transmitted from the light valve towards a screen. A dynamic optical compensation means disposed between the directing means and the light valve is provided for minimizing any residual polarization transmitted by the light valve for each of the different color lights. Lastly, a lens for magnifying and projecting the adjusted color light components onto the screen to produce the color image is provided.

In variations of the preferred embodiments, the dynamic focus element and dynamic optical compensation means comprises various mechanical and electro-optical devices.

BRIEF DESCRIPTION OF THE DRAWINGS

These and other features, aspects, and advantages of the apparatus and methods of the present invention will become better understood with regard to the following description, appended claims, and accompanying drawings where:

FIG. 2D illustrates a fourth variation of the first embodiment of a color sequencing light valve display of the present invention, in which the light valve is of the reflective type.

FIG. 2E illustrates a fifth variation of the first embodiment of a color sequencing light valve display of the present invention, in which the light valve is of the reflective type.

DETAILED DESCRIPTION OF THE INVENTION

Although this invention is applicable to both displays utilizing transmissive and reflective light valves, it has been found particularly useful in the environment of the reflective light valve displays. Therefore, without limiting the applicability of the invention to the reflective light valve display, the invention will be described in such environment. Furthermore, while the present invention has been found particularly useful in the environment of a single light valve display, and described in such environment, it is applicable to double light valve display systems as well, such as those described in U.S. Pat. No. 5,517,340 to Doany et al., which is incorporated herein by its reference.

The first embodiment of the present invention describes optical configurations for which chromatic variations in the polarization retardation and chromatic magnification variations that lead to improper usage overlay can be minimized. By introducing electro-optical and/or opto-mechanical components that can control the chromatic optical variations in the system, simpler and less expensive optical components can be used in the color sequential projection system.

Minimizing the chromatic variations in the optical system is accomplished with the use of a dynamic element(s). The dynamic elements will modify the chromatic performance of the total optical system. By precisely controlling the chromatic properties of these dynamic optical elements, the performance of the system can be optimized for each of the three colors, although only for one color at a time. However, in a color-sequential mode of operation, only one color component is used at any one time. Therefore, dynamic control of the optical properties can produce optimum optical performance for all three color components and provide the optimum composite image in a color-sequential projection display.

Dynamic focusing can be used with a simple lens to control magnification and/or focal length. Typically, the focal length of a lens is slightly different for the three colors. But rather than design a complicated lens to correct this effect, a dynamic element can be used to change the optical path in the projection optical configuration. The dynamic focus element is adjusted for each color so that the optical path is correct for the simple lens. Similarly, the magnification of a lens typically varies for the three color components. However, changing the focus position of the object (e.g., SLM) will result in a magnification change in the simple projection lens. Thus, dynamic focus position control can result in better overlay of the three color images in the color-sequential projection system.

Figure 2A:
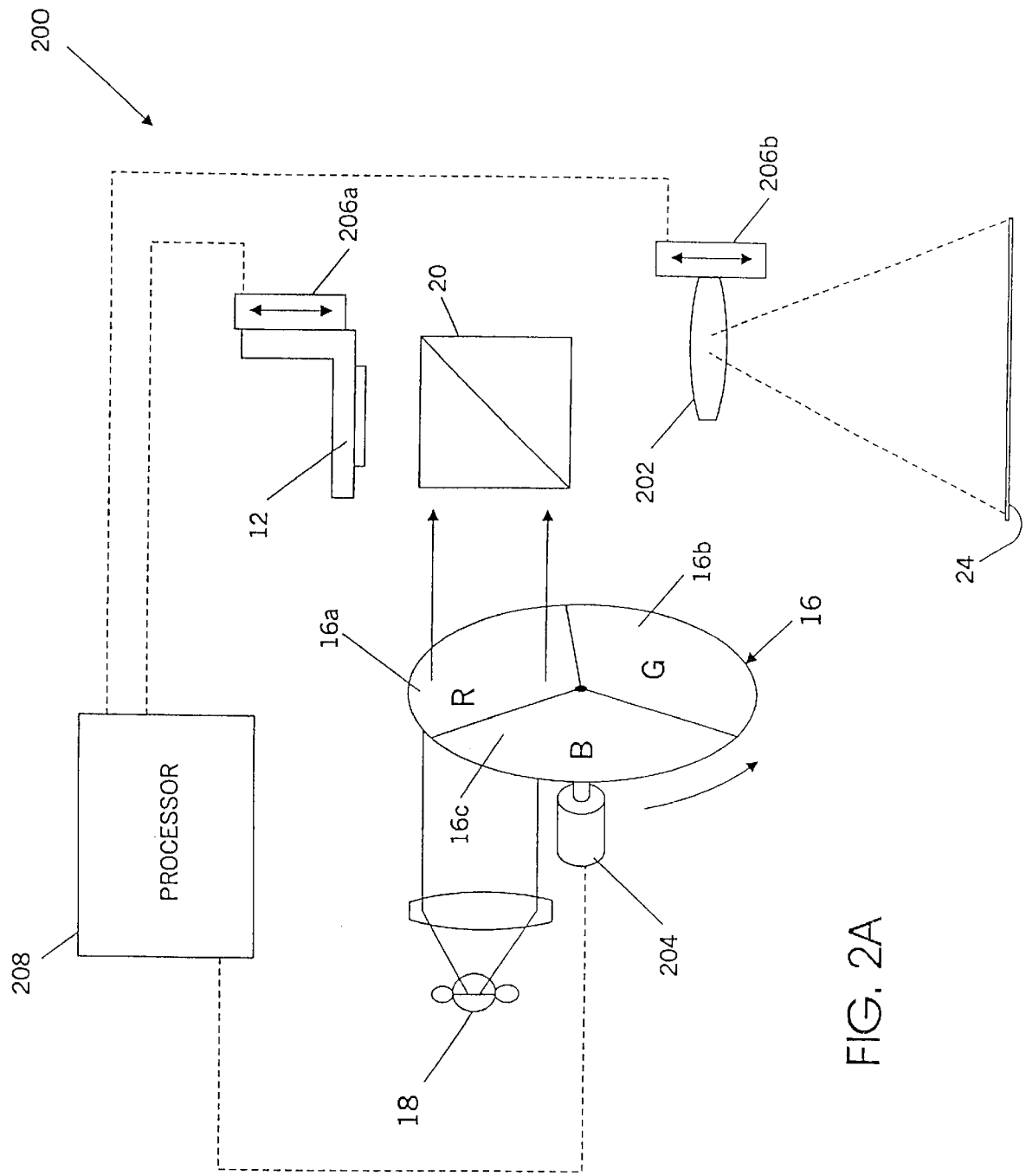
FIG. 2A illustrates a first variation of the first embodiment of a color sequencing light valve display of the present invention, in which the light valve is of the reflective type.

Referring now to FIG. 2A, there is shown a first variation of the first embodiment of the present invention, referred to generally by reference numeral 200, in which a mechanical device is used to alternately change the optical configuration for each sequential color. FIG. 2A illustrates such a display 200 for displaying a color image formed of a plurality of color light components, each color light component having a focal length and a magnification. The display 200 comprises a light source 18 for providing polarized light of a first polarization, and a color filter wheel 16 having segments 16a, 16b, and 16c of different color filters for sequentially separating the polarized light into a plurality of different color lights. The segments 16a, 16b, and 16c are typically equally sized red, green and blue segments, respectively.

Display 200 also includes a directing means for directing the different color lights having the first polarization to a light valve 12 and for directing respective color light components of a second polarization transmitted from the light valve 12 towards a screen 24. If the display 200, as illustrated in FIG. 2A, utilizes a reflective type light valve, then the directing means is a polarization beamsplitter cube 20 positioned such that the different color lights of the first polarization are directed towards the light valve 12, and the transmitted color light components of the second polarization from the light valve 12 are reflected back towards the polarization beamsplitter cube 20. However, the display 200 of FIG. 2A can also utilize a transmissive light valve in which case the directing means comprises first and second polarizing films, as shown in FIG. 1B, oriented 90° to one another and sandwiching the light valve, such that only the transmitted color light components of the second polarization from the light valve are transmitted towards the lens. Although, the variations of the first embodiment of the present invention are illustrated with respect to a reflective type light valve display, it is understood that they ale equally applicable to a transmissive type display.

A dynamic focus element for adjusting the focal length and/or magnification of each color light component to minimize chromatic variations between the color light components is also provided in display 200. As illustrated in FIG. 2A, the dynamic focus element comprises control means for adjusting and controlling the relative position of the light valve 12 and lens 202 with respect to each other wherein a given relative position corresponds to a color segment 16a, 16b, 16c on the color filter wheel 16.

The control means preferably comprises a motor 204 rotatably connected to the color filter wheel 16, piezo or motor driven stages 206a, 206b connected to the light valve 12 and/or lens 202, respectively, for adjusting the relative position of the light valve 12 and lens 202 with respect to each other. The control means also preferably includes a processor 208 for synchronizing the motor 204 and piezo or motor driven stages 206a, 206b to achieve the proper adjustment in relative position between the light valve 12 and lens 202 for each of the different color segments 16a, 16b, 16c on the color filter wheel 16.

For example, when the red color filter segment 16a is being illuminated by the light source 18, the relative distance between the light valve 12 and lens 202 will change to a predetermined distance to minimize the chromatic variations for the red light component reflected by the light valve 12. This can be achieved by either the light valve 12, or lens 202, or both the light valve 12 and lens 202 changing their position as a result of the processor inputting a signal to their respective stages 206a, 206b to take a predetermined position. As the color filter wheel 16 rotates such that the green filter segment 16b is then in the optical path, the relative position of the light valve 12 and lens 202 is changed, as prompted by the processor 208, to take on a predetermined position to minimize the chromatic variations for the green light component reflected by the light valve 12. This process repeats as the color filter wheel 16 rotates.

The lens 202 then magnifies and projects the adjusted color light components onto the screen to produce the color image. Because, the chromatic variations between the different color light components has been minimized, or eliminated, the lens 202 can be of a simple construction, and thus less costly.

Figure 2B:
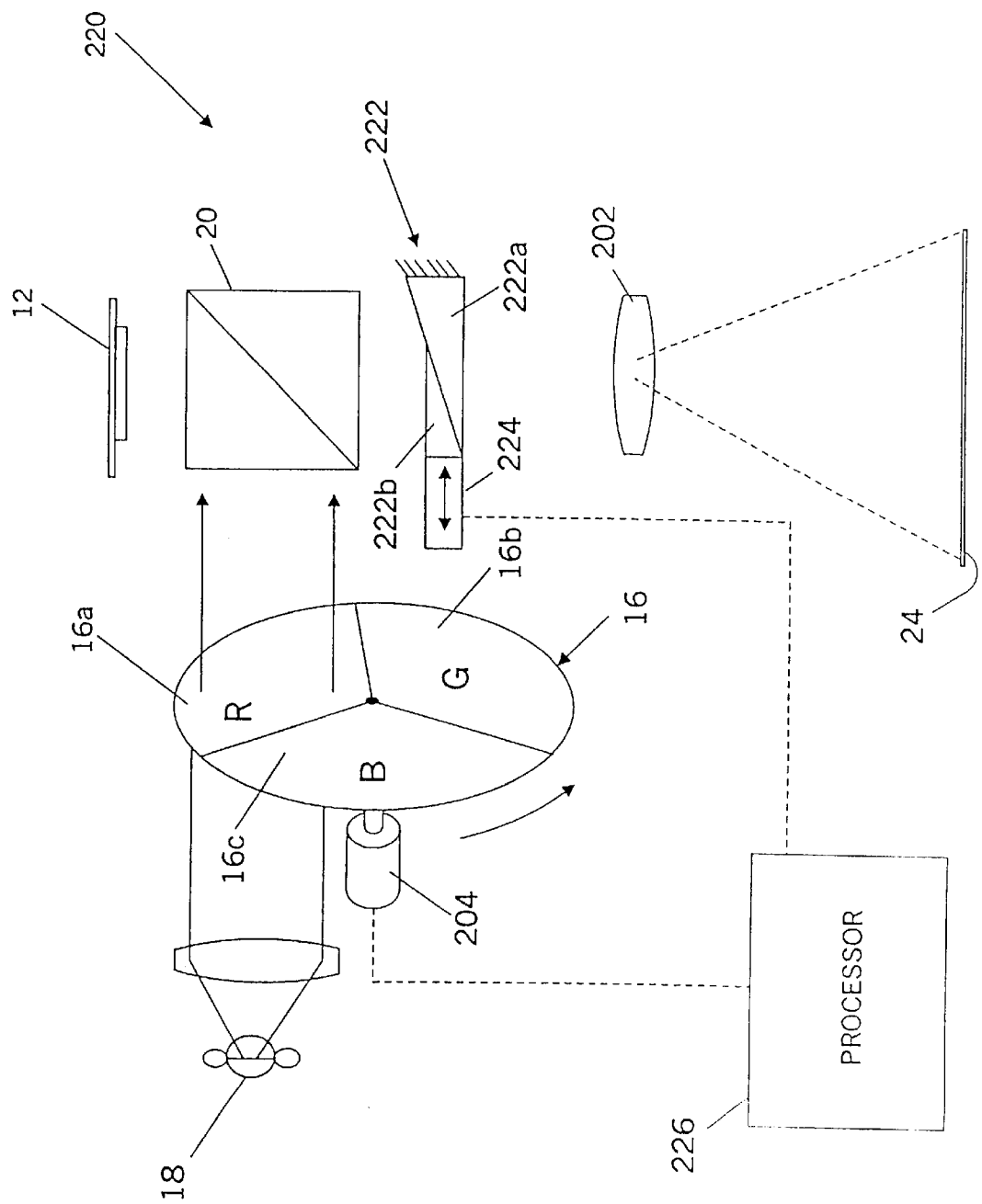
FIG. 2B illustrates a second variation of the first embodiment of a color sequencing light valve display of the present invention, in which the light valve is of the reflective type.

Referring now to FIG. 2B, there is shown a second variation of the first embodiment of the present invention, referred to generally by reference numeral 220, in which the light valve 12 and lens 202 position is fixed, but the optical path between the light valve 12 and the projection lens 202 is modulated by the insertion of an index modulation device between the light valve 12 and the lens 202. As illustrated in FIG. 2B, one such index modulation device comprises a pair of wedges 222 which slide relative to one another, changing the thickness of material which the light passes through.

The pair of wedges 222 preferably comprises first and second transmissive wedges 222a, 222b, arranged such that relative motion between the wedges causes their overall thickness to increase or decrease. Wherein a given overall thickness corresponds to a color segment 16a, 16b, 16c on the color filter wheel 16. Preferably, the first wedge 222a is fixed and the second wedge 222b translates over the first wedge 222a to provide the variation in overall thickness of the pair of wedges 222 and thus the variation in index of refraction.

A control means for causing the relative motion between the wedges and for synchronizing the overall thickness of the wedges with the corresponding color segment on the color filter wheel is also provided in display 220. The control means comprises a first motor 204 rotatably connected to the color filter wheel 16, a motor driven stage 224 connected to the second wedge 222b, and a processor 226 for synchronizing the first motor 204 and motor driven stage 224.

In operation, when the red color filter segment 16a is being illuminated by the light source 18, the overall thickness of the pair of wedges 222 will change to a predetermined thickness to change the index of refraction of the wedges 222 thus minimizing the chromatic variations for the red light component reflected by the light valve 12. This is achieved as a result of the processor 226 inputting a signal to the motor driven stage 224 to translate the second wedge 222b to a predetermined position based upon the geometry of the wedges 222. As the color filter wheel 16 rotates such that the green filter segment 16b is then in the optical path, the position of the second wedge 222b is again changed, as prompted by the processor 226, to take on a predetermined position to minimize the chromatic variations for the green light component reflected by the light valve 12. This process repeats as the color filter wheel 16 rotates.

Figure 2C:
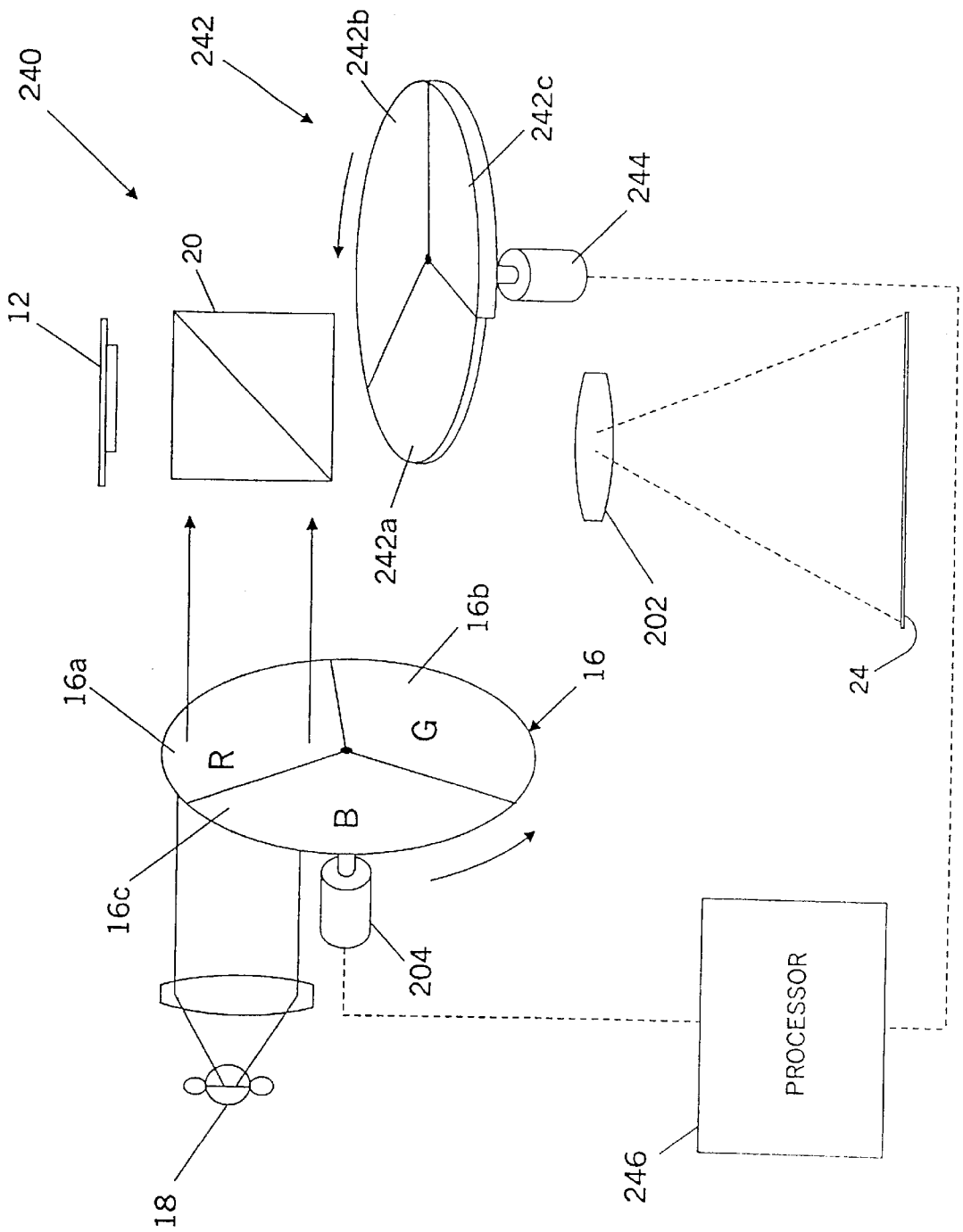
FIG. 2C illustrates a third variation of the first embodiment of a color sequencing light valve display of the present invention, in which the light valve is of the reflective type.

Alternatively, as shown in FIG. 2C, a third variation of the first embodiment of the present invention is illustrated, referred to generally by reference numeral 240, in which the index modulation device is a transmissive thickness wheel 242 synchronized to the color filter wheel 16 which produces the alternate red-green-blue color lights. The thickness wheel 242 of display 240 has a plurality of thickness segments 242a, 242b, 242c, each having a different thickness and corresponding to a color segment 16a, 16b, 16c on the color filter wheel 16. A control means synchronizes the color segments 16a, 16b, 16c on the color filter wheel 16 to the corresponding thickness segments 242a, 242b, 242c on the thickness wheel 242.

Preferably, the control means comprises a first motor 204 rotatably connected to the color filter wheel 16, a second motor 244 rotatably connected to the thickness wheel 242, and a processor 246 for synchronizing the first and second motors 204, 244 respectively.

In operation, when the red color filter segment 16a is being illuminated by the light source 18, thickness segment 242a of the thickness wheel 242 will be positioned in the optical path between the polarized beamsplitter cube 20 and the lens 202 to provide a thickness and corresponding index of refraction to minimize the chromatic variations for the red light component reflected by the light valve 12. This is achieved as a result of the processor 246 inputting a signal to the second motor 244 to rotate the thickness wheel 242 such that the thickness segment 242a corresponding to the red color segment 16a is in the optical path. As the color filter wheel 16 rotates such that the green filter segment 16b is then in the optical path, the thickness wheel 242 is rotated, as prompted by the processor 246, such that the corresponding thickness segment 242b to minimize the chromatic variations for the green light component reflected by the light valve 12 is in the optical path. This process repeats as the color filter wheel 16 rotates.

Dynamic focusing is not limited to mechanical devices, electro-optical devices can also be used, as illustrated in FIGS. 2D and 2E. In an electro-optical material, the index of refraction can be changed by applying an electric field to the material. As shown in FIG. 2D, a fourth variation of the first embodiment of the present invention is illustrated, referred to generally by reference numeral 260, in which the index modulation device is an electro-optical material 262 sandwiched between two transmissive electrodes 264, 268 and placed between the lens 202 and beamsplitter cube 20. The index of refraction of the electro-optic material 262 varies in proportion to an applied potential difference, wherein a given potential difference corresponds to a color segment 16a, 16b, 16c on the color filter wheel 16. A control means synchronizes the amount of applied potential difference with the corresponding color segment 16a, 16b, 16c on the color filter wheel 16.

The control means preferably comprises a motor 204 rotatably connected to the color filter wheel 16, a power source 270 for applying the potential difference across the two transmissive electrodes 264, 268, and a processor 272 for synchronizing the amount of applied potential difference from the power source with the motor 204 of the color filter wheel 16.

For each color segment 16a, 16b, 16c on the color filter wheel 16, a different potential, as supplied by the power source 270, and prompted by the processor 272, is applied between the electrodes 264, 268 on the electro-optical material 262 changing the index of refraction of the electro-optic material 262 and, therefore, the optical path length.

Alternatively, as shown in FIG. 2E, a fifth variation of the first embodiment of the present invention is illustrated, referred to generally by reference numeral 280, in which the index modulation device is the polarized beamsplitter cube 282 which is made from an electro-optical material and sandwiched between transmissive electrodes 284, 286. The operation of display 280 is then much the same as display 260, except that the potential is applied to the transmissive electrodes 284, 286 of the polarized beamsplitter cube 282 for optical path length control.

As for the previous variation of the first embodiment, for each color segment 16a, 16b, 16c on the color filter wheel 16, a different potential, as supplied by the power source 270 and prompted by a processor 290, is applied between the electrodes 284, 286 on the polarized beamsplitter cube 282 changing the index of the polarized beamsplitter cube 282 and, therefore, the optical path length.

As stated earlier, dynamic optical compensation can also be used to precisely modify the polarization retardation for each of the three colors. For a given set of on and off voltages, a light valve will provide a precise polarization phase shift for only one color. This could lead to leakage and/or loss of brightness for the other two colors. A second embodiment of the present invention is provided wherein an optical element is used to compensate for this effect for the other colors.

Figure 1A:
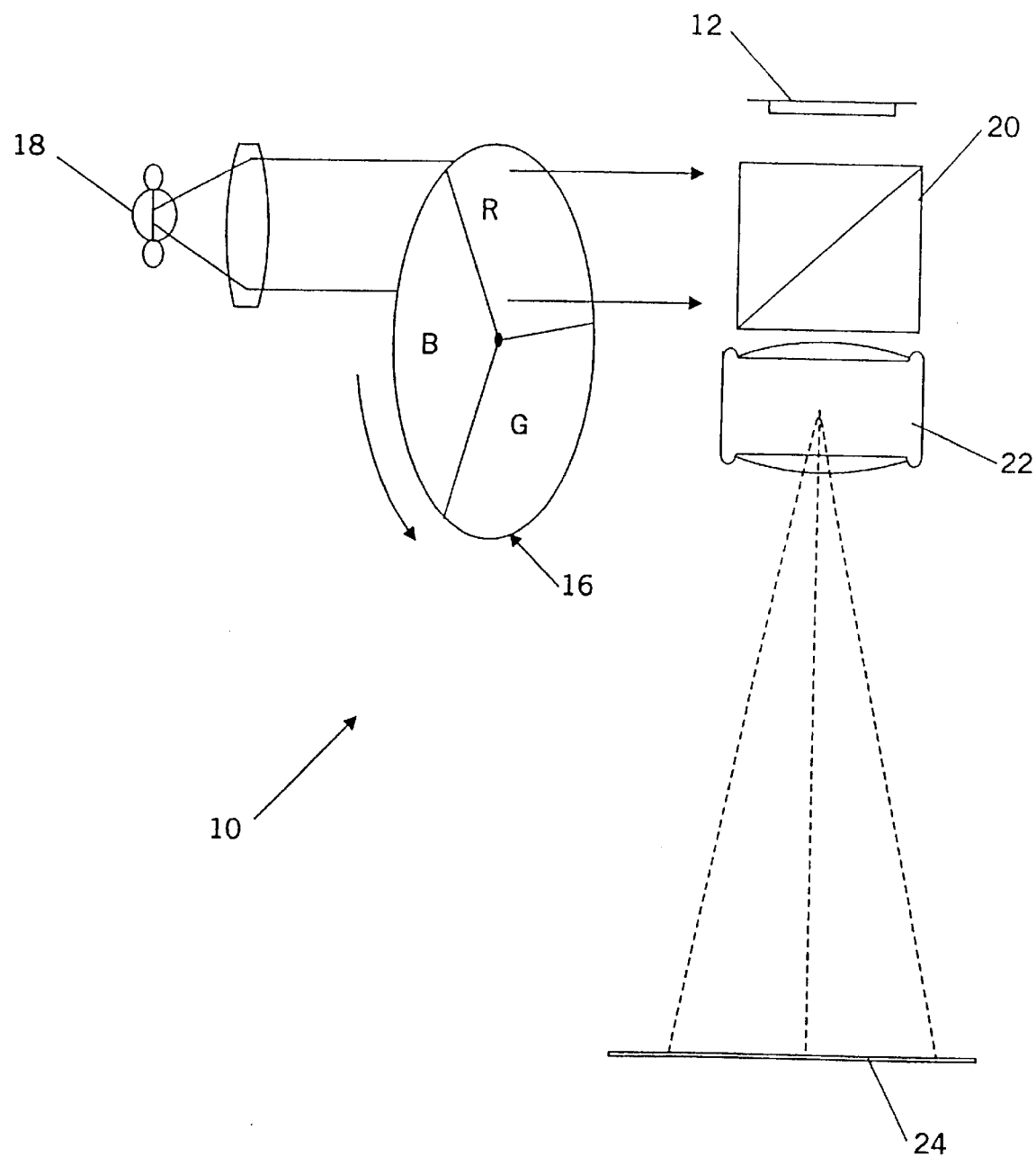
FIG. 1A illustrates a color sequencing single light valve display of the prior art, in which the light valve is of the reflective type.
Figure 1B:
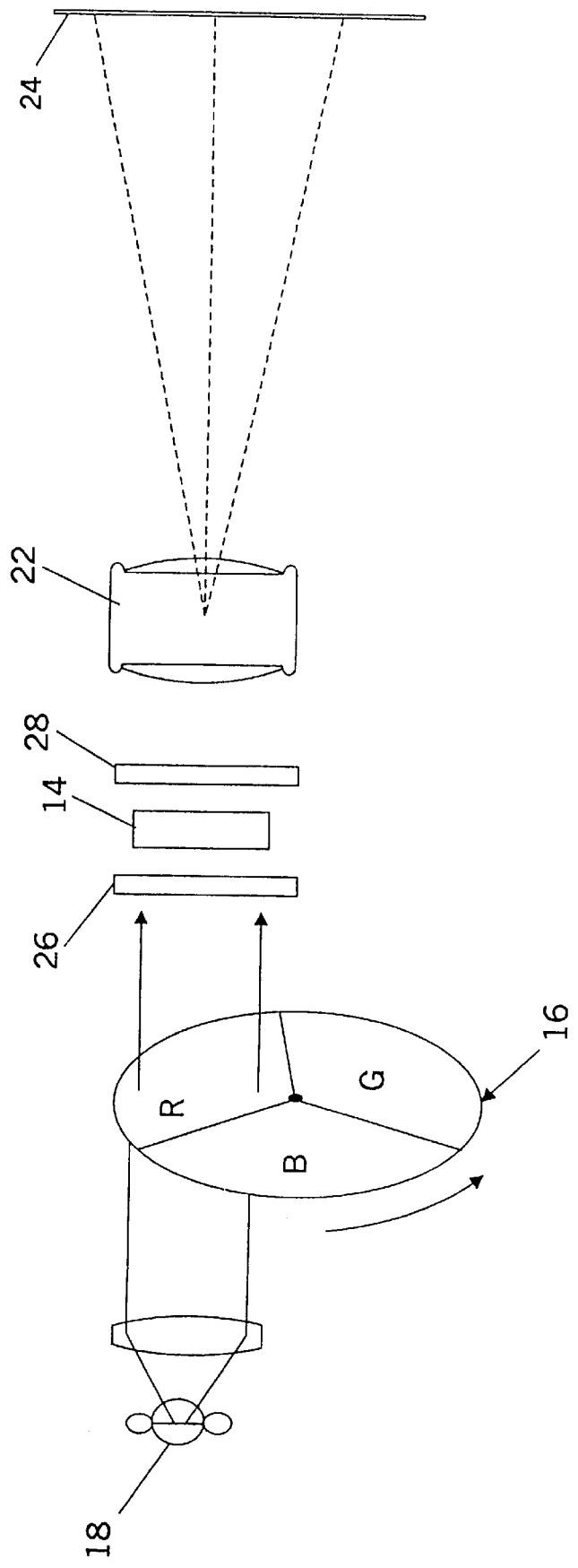
FIG. 1B illustrates a color sequencing single light valve display of the prior art, in which the light valve is of the transmissive type.
Figure 3A:
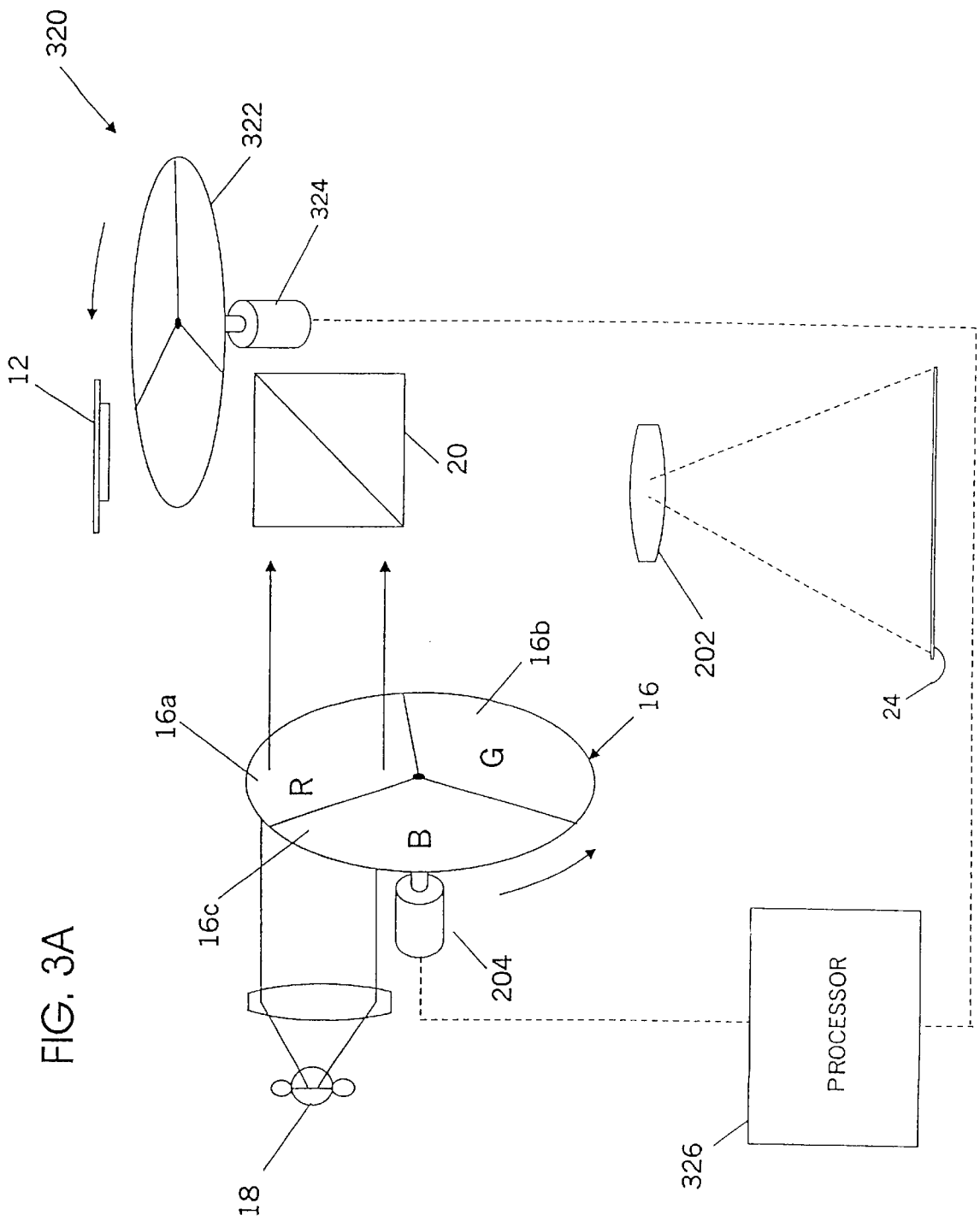
FIG. 3A illustrates a first variation of a second embodiment of a color sequencing light valve display of the present invention, in which the light valve is of the reflective type.
Figure 3B:
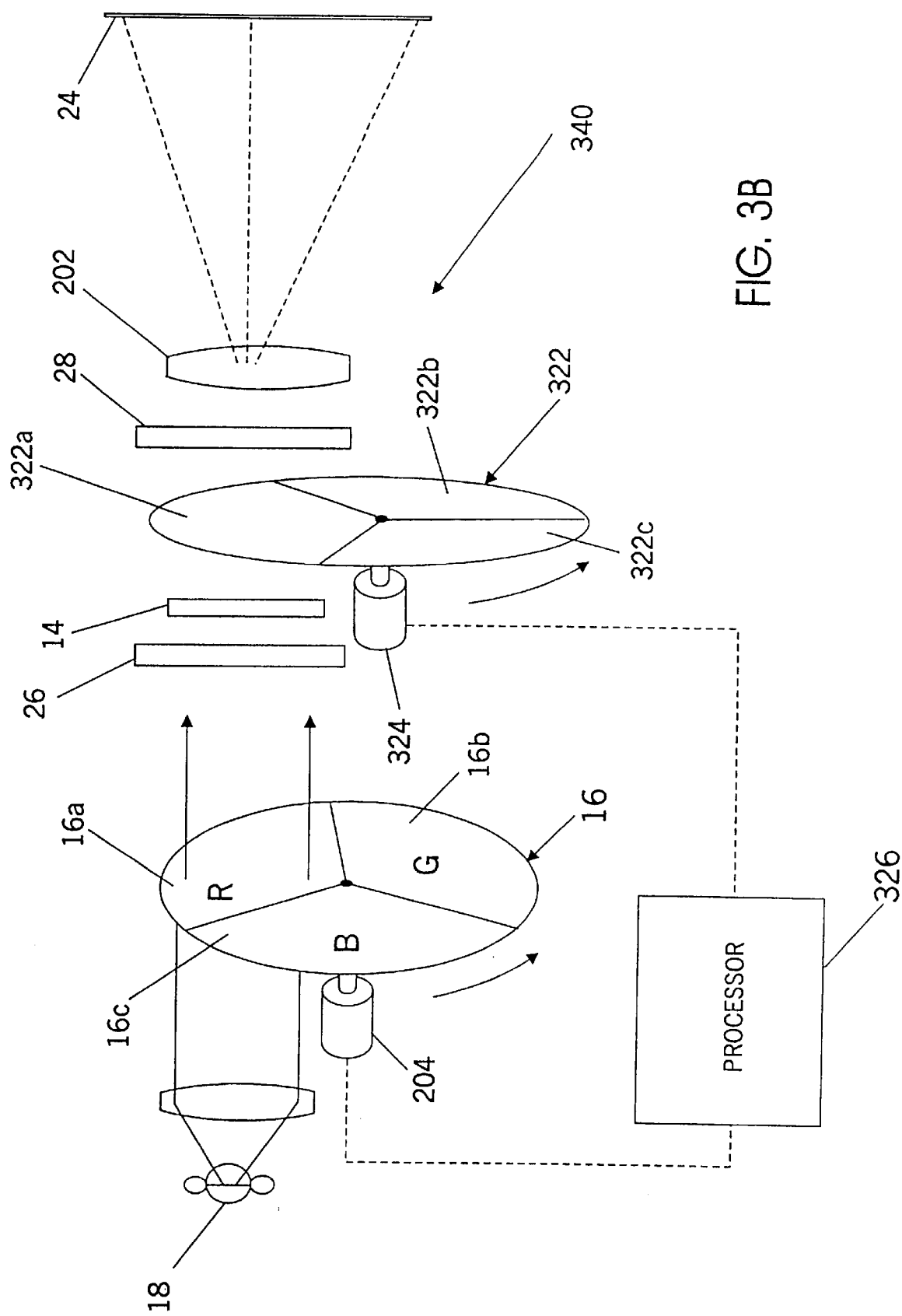
FIG. 3B illustrates the first variation of the second embodiment of the color sequencing light valve display of the present invention, in which the light valve is of the transmissive type.

Referring now to FIGS. 3A and 3B, a first variation of the second embodiment of the present invention is illustrated and generally referred to by reference numerals 300 and 320 respectively, in which the reflective SLM device illustrated in FIG. 1A is modified with the insertion of a new component, the dynamical polarization compensator (DPC), as illustrated in FIG. 3A, and where a similar modification for the transmission mode SLM device of FIG. 1B is illustrated in FIG. 3B.

In the first variation of the second embodiment the dynamic polarization compensator component is a polarization retardation wheel 322 which is synchronized to the color filter wheel 16. Each color segment 16a, 16b, 16c of the color wheel 16 has a corresponding waveplate 322a, 322b, 322c on the polarization retardation wheel 322. This provides a fixed retardation to optimize the performance of the reflective or transmissive light valve 12, 14 respectively, for that color.

For example, a liquid crystal display element might provide zero rotation for the red color, but have a residual polarization for the green color at the "off" voltage. This residual polarization retardation results in some of the light of the green color passing through to the screen 24 in the off state. Such leakage can degrade contrast. In this case, the polarization retardation wheel 322 would not disturb the red color, but would provide a retardation for the green color that cancels the residual polarization rotation described above. In this case, the green color light will no longer have a polarization change in the off state, thus improving contrast.

Under certain circumstances, the brightness is a greater problem than contrast. This problem arises because the "on" voltage might provide a half-wave rotation of the polarization for a first color, but for a second color the phase change only produces elliptically polarized light. Therefore, for the second color, the brightness in the "on" state will be reduced. This can be fixed with the polarization compensator wheel 322 which leaves the first color unchanged but provides a polarization retardation for the other color such that there is complete half-wave rotation in the "on" state. In much the same way as previously described, a first motor 204 rotatably connected to the color filter wheel 16, a second motor 324 rotatably connected to the polarization compensator wheel 322, and a processor 326 work together to, synchronize the color segments 16a, 16b, 16c of the color wheel 16 with the corresponding wave plate segments 322a, 322b, 322c of the polarization compensator wheel 322.

Alternatively, the dynamic polarization compensator can be various other opto-mechanical devices known in the art, such as a mechanically tuned Babinet compensator which allows for the dynamic selection of polarization retardation.

The dynamical polarization compensator can also be an electro-optical device, as previously described with regard to FIGS. 2D and 2E. In the electro-optical material, the index of refraction for the slow and fast axes can be changed with an applied potential. Thus, the polarization phase retardation is determined by the voltage applied to the electro-optic material. Thus, the dynamical polarization compensation is achieved by varying the applied potential.

While there has been shown and described what is considered to be preferred embodiments of the invention, it will, of course, be understood that various modifications and changes in form or detail could readily be made without departing from the spirit of the invention. It is therefore intended that the invention be not limited to the exact forms described and illustrated, but should be constructed to cover all modifications that may fall within the scope of the appended claims.

Having thus described our invention, what we claim as new, and desire to secure by Letters Patent is:

1. A display for displaying a color image formed of a plurality of color light components, each color light component having a focal length and a magnification, the display comprising:

a light source for providing polarized light of a first polarization, a color filter wheel having segments of different color filters for sequentially separating the polarized light into a plurality of different color lights, directing means for directing the different color lights having the first polarization to a light valve and for directing respective color light components of a second polarization transmitted from the light valve towards a screen, a dynamic focus element for adjusting the focal length and/or magnification of each color light component to minimize chromatic variations between the color light components, and a lens for magnifying and projecting the adjusted color light components onto the screen to produce the color image.

2. The display of claim 1, wherein the directing means comprises a polarization beamsplitter cube positioned such that the different color lights of the first polarization are directed towards the light valve, and the transmitted color light components of the second polarization from the light valve are reflected back towards the polarization beamsplitter cube.

3. The display of claim 1, wherein the directing means comprises first and second polarizing films oriented 90° to one another and sandwiching the light valve, such that only the transmitted color light components of the second polarization from the light valve are transmitted towards the lens.

4. The display of claim 1, wherein the color filter wheel comprises equally sized segments of red, blue, and green color filters.

5. The display of claim 1, wherein the dynamic focus element comprises control means for adjusting and controlling the relative position of the light valve and lens with respect to each other wherein a given relative position corresponds to a color segment on the color filter wheel.

6. The display of claim 5, wherein the control means comprises:

a motor rotatably connected to the color filter wheel, a piezo drive stage connected to the light valve and/or lens for adjusting the relative position of the light valve and lens with respect to each other, and a processor for synchronizing the motor and piezo drive stage to achieve the proper adjustment in relative position between the light valve and lens for each of the different color segments on the color filter wheel.

7. The display of claim 5, wherein the control means comprises:
a motor rotatably connected to the color filter wheel,
a motor driven stage connected to the light valve and/or lens for adjusting the relative position of the light valve and lens with respect to each other, and
a processor for synchronizing the motor and motor driven stage to achieve the proper adjustment in relative position between the light valve and lens for each of the different color segments on the color filter wheel.

8. The display of claim 1, wherein the dynamic focus element comprises an index modulation means disposed between the directing means and lens for changing the index of refraction of the dynamic focus element for each of the different color light components.

9. The display of claim 8, wherein the index modulation means comprises:
first and second transmissive wedges, arranged such that relative motion between the wedges causes their overall thickness to increase or decrease wherein a given overall thickness corresponds to a color segment on the color filter wheel, and
a control means for causing the relative motion between the wedges and for synchronizing the overall thickness of the wedges with the corresponding color segment on the color filter wheel.

10. The display of claim 9, wherein the first wedge is fixed and the second wedge translates over the first wedge, and wherein the control means comprises a first motor rotatably connected to the color filter wheel, a motor driven stage connected to the second wedge, and a processor for synchronizing the first motor and motor driven stage.

11. The display of claim 8, wherein the index modulation means comprises:
a transmissive thickness wheel having a plurality of segments, each segment having a different thickness and corresponding to a color segment on the color filter wheel, and
a control means for synchronizing the color segments on the color filter wheel to the corresponding thickness segment on the thickness wheel.

12. The display of claim 11, wherein the control means comprises a first motor rotatably connected to the color filter wheel, a second motor rotatably connected to the thickness wheel, and a processor for synchronizing the first and second motors.

13. The display of claim 8, wherein the index modulation means comprises an electro-optic device in which its index of refraction varies in proportion to an applied potential difference wherein a given potential difference corresponds to a color segment on the color filter wheel, and a control means for synchronizing the amount of applied potential difference with the corresponding color segment on the color filter wheel.

14. The display of claim 13, wherein the electro-optic device comprises an electro-optic material sandwiched between two transmissive electrodes, and wherein the control means comprises:
a motor rotatably connected to the color filter wheel,
a power source for applying the potential difference across the two transmissive electrodes, and
a processor for synchronizing the amount of applied potential difference from the power source with the motor of the color filter wheel.

15. The display of claim 1, wherein the directing means and dynamic focus element are of integral construction.

16. The display of claim 15, wherein the directing means and dynamic focus element comprise a polarizing beamsplitter cube made of an electro-optic material sandwiched between two transmissive electrodes in which the index of refraction of the polarized beamsplitter cube varies in proportion to a potential difference applied between the two electrodes wherein a given potential difference corresponds to a color segment on the color filter wheel, and a control means for synchronizing the amount of applied potential difference with the corresponding color segment on the color filter wheel.

17. The display of claim 16, wherein the control means comprises:
a motor rotatably connected to the color filter wheel,
a power source for applying the potential difference across the two transmissive electrodes, and
a processor for synchronizing the amount of applied potential difference from the power source with the motor of the color filter wheel.

18. A display for displaying a color image formed of a plurality of color light components, the display comprising:
a light source for providing polarized light of a first polarization,
a color filter wheel having segments of different color filters for sequentially separating the polarized light into a plurality of different color lights,
directing means for directing the different color lights having the first polarization to a light valve and for directing respective color light components of a second polarization transmitted from the light valve towards a screen,
a dynamic optical compensation means disposed between the directing means and the light valve for minimizing any residual polarization transmitted by the light valve for each of the different color lights, and
a lens for magnifying and projecting the adjusted color light components onto the screen to produce the color image.

19. The display of claim 18, wherein the directing means comprises a polarization beamsplitter cube positioned such that the different color lights of the first polarization are directed towards the light valve, and
the transmitted color light components of the second polarization from the light valve are reflected back towards the polarization beamsplitter cube.

20. The display of claim 18, wherein the directing means comprises first and second polarizing films oriented 90° to one another and sandwiching the light valve, such that only the transmitted color light components of the second polarization from the light valve are transmitted towards the lens.

21. The display of claim 18, wherein the color filter wheel comprises equally sized segments of red, blue, and green color filters.

22. The display of claim 18, wherein the dynamic optical compensation means comprises a polarization retardation wheel having a plurality of waveplate segments corresponding to the color segments of the color filter wheel for minimizing any residual polarization transmitted by the light valve for each of the different color lights, and a control means for synchronizing each segment of the color filter wheel with the corresponding waveplate segment on the polarization retardation wheel.

23. The display of claim 22, wherein the control means comprises a first motor rotatably connected to the color filter wheel, a second motor rotatably connected to the polarization retardation wheel, and a processor for synchronizing the first and second motors.

24. The display of claim 18, wherein the dynamic optical compensation means comprises an electro-optic device in which its index of refraction varies in proportion to an applied potential difference wherein a given potential difference corresponds to a color segment on the color filter wheel, and a control means for synchronizing the amount of applied potential difference with the corresponding color segment on the color filter wheel.

25. The display of claim 24, wherein the electro-optic device comprises an electro-optic material sandwiched between two transmissive electrodes, and wherein the control means comprises:
- a motor rotatably connected to the color filter wheel,
- a power source for applying the potential difference across the two transmissive electrodes, and
- a processor for synchronizing the amount of applied potential difference from the power source with the motor of the color filter wheel.

* * * * *